US011734133B2

(12) United States Patent
Sugihara et al.

(10) Patent No.: US 11,734,133 B2
(45) Date of Patent: Aug. 22, 2023

(54) CLUSTER SYSTEM AND FAIL-OVER CONTROL METHOD OF CLUSTER SYSTEM

(71) Applicant: Hitachi, Ltd., Tokyo (JP)

(72) Inventors: Keita Sugihara, Tokyo (JP); Keisuke Matsumoto, Tokyo (JP); Yuki Kuroda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 86 days.

(21) Appl. No.: 17/404,469

(22) Filed: Aug. 17, 2021

(65) Prior Publication Data
US 2022/0129357 A1 Apr. 28, 2022

(30) Foreign Application Priority Data
Oct. 27, 2020 (JP) .................. 2020-180031

(51) Int. Cl.
G06F 11/20 (2006.01)
G06F 11/30 (2006.01)
G06F 3/06 (2006.01)
G06F 9/455 (2018.01)

(52) U.S. Cl.
CPC .......... *G06F 11/2023* (2013.01); *G06F 3/067* (2013.01); *G06F 3/0619* (2013.01); *G06F 3/0652* (2013.01); *G06F 3/0665* (2013.01); *G06F 9/45558* (2013.01); *G06F 11/3006* (2013.01); *G06F 11/3034* (2013.01);
(Continued)

(58) Field of Classification Search
CPC ............ G06F 11/2023; G06F 11/3006; G06F 11/3034; G06F 11/3055; G06F 11/2028; G06F 11/2094; G06F 11/2041; G06F 3/0619; G06F 3/0652; G06F 3/0665; G06F 3/067; G06F 3/0635; G06F 9/45558; G06F 2009/45591; G06F 2009/45595; G06F 2201/815
See application file for complete search history.

(56) References Cited

U.S. PATENT DOCUMENTS 10,318,320 B1 * 6/2019 Thomas .............. G06F 9/45558
10,642,501 B1 * 5/2020 Patel ................... G06F 12/1009
(Continued)

FOREIGN PATENT DOCUMENTS

JP 6555353 B2 8/2019

*Primary Examiner* — Matthew M Kim
*Assistant Examiner* — Matthew N Putaraksa
(74) *Attorney, Agent, or Firm* — Mattingly & Malur, PC

(57) ABSTRACT

A cluster system has nodes connected by a first network, including a master node, a first node performing an IO request with respect to a first volume of a storage device capable of including a plurality of volumes through a second network, and a second node taking over processing of the first node at the time of a failure of the first node. When a failure of the first network occurs in the first node, the master node transmits a connection release instruction through the second network. When the connection release instruction is received, the storage device releases the connection between the first node and the first volume, and updates connection state management information for managing such a connection state. The first node acquires the connection state to be managed through the second network, and executes post-processing relevant to the first volume that is associated with the connection release instruction.

10 Claims, 19 Drawing Sheets

(52) U.S. Cl.
CPC .............. *G06F 2009/45591* (2013.01); *G06F 2009/45595* (2013.01)

(56) References Cited

U.S. PATENT DOCUMENTS

| | | | | |
|---|---|---|---|---|
| 2005/0125557 | A1* | 6/2005 | Vasudevan | G06F 11/2038 709/239 |
| 2010/0325477 | A1* | 12/2010 | Takamoto | G06F 11/2017 714/5.11 |
| 2012/0036306 | A1* | 2/2012 | Miyoshi | G06F 13/4022 710/316 |
| 2016/0308709 | A1* | 10/2016 | Fernandez-Palacios Gimenez | H04L 67/52 |

* cited by examiner

Fig. 5

MOUNT POINT INFORMATION 500

| MOUNT SOURCE (DEVICE FILE NAME) | MOUNT DESTINATION (MOUNT POINT) |
|---|---|
| /dev/sdx | /mnt/sdx |
| /dev/mapper/mpathx | /mnt/mpathx |
| ... | ... |

VOLUME CONNECTION STATE MANAGEMENT INFORMATION 600

| VOLUME ID | CONNECTION SOURCE INFORMATION (STORAGE ID) | CONNECTION DESTINATION INFORMATION (NODE ID) | CONNECTION STATE |
|---|---|---|---|
| 0 | 001 | 1 | CONNECTED STATE |
| 1 | 001 | 1 | CONNECTION RELEASE WAIT STATE |
| ... | ... | ... | ... |

NODE INFORMATION 700

| NODE NAME | NODE ID | ... |
|---|---|---|
| nodeA | 1 | ... |
| nodeB | 2 | ... |
| ... | ... | ... |

VOLUME INFORMATION 800

| VOLUME NAME | STORAGE ID | VOLUME ID | ... |
|---|---|---|---|
| pvcA | 001 | 1 | ... |
| pvcB | 001 | 2 | ... |
| ... | ... | ... | ... |

| DEVICE FILE NAME | STORAGE ID | VOLUME ID | ... |
|---|---|---|---|
| sdx | 1 | 10 | ... |
| ... | ... | ... | ... |

901 — DEVICE FILE NAME
902 — STORAGE ID
903 — VOLUME ID
DEVICE FILE 900

Fig. 10

INFORMATION FOR SCSI COMMUNICATION 1000

| STORAGE ID 1001 | VOLUME ID 1002 | DEVICE FILE NAME 1003 | SCSI COMMUNICATION INFORMATION 1004 |
|---|---|---|---|
| 001 | 1 | /dev/sda | True |
| 001 | 2 | /dev/sdb | False |
| 002 | 1 | /dev/sdc | False |
| ... | ... | ... | ... |

US 11,734,133 B2

CLUSTER SYSTEM AND FAIL-OVER CONTROL METHOD OF CLUSTER SYSTEM

CROSS-REFERENCE TO RELATED APPLICATION

The present application claims priority from Japanese application JP 2020-180031, filed on Oct. 27, 2020, the contents of which is hereby incorporated by reference into this application.

BACKGROUND OF THE INVENTION

1. Field of the Invention

The present invention relates to a fail-over in a cluster system, and in particular, relates to a fail-over technology in a container-based virtualization environment.

2. Description of the Related Art

Examples of a method for improving the availability of an information technology (IT) service include a method for constructing a cluster system including an active node that actually provides a service and a standby node that takes over and provides the service when a failure occurs in the active node. In order for the standby node to take over the service from the active node, it is necessary to take over not only a program that is used by the active node but also data that is used by the program.

A technology for reducing an operational cost of a cluster system and for attaining a fail-over is disclosed in JP 6555353 B2.

The cluster system in JP 6555353 B2 described above includes a first node that includes a first memory unit and is operated as an active system, a second node that includes a second memory unit and is operated as a standby system, a first control device that controls the activation of the second node, and a third memory unit that is provided separately from the first node and the second node. Then, the first node includes a synchronous data generation unit that generates synchronous data for synchronizing a memory content of the first memory unit with a memory content of the second memory unit in a case where the memory content of the first memory unit is updated, a synchronous data transmission unit that transmits the synchronous data generated by the synchronous data generation unit to the third memory unit to be memorized in the third memory unit, and a first activation instruction transmission unit that transmits an activation instruction for instructing the second node to proceed to an activation state from a stop state to the first control device in a case where the synchronous data is transmitted by the synchronous data transmission unit. In addition, in a case where the activation instruction is received, the first control device activates the second node. In addition, the second node includes a synchronous data acquisition unit that acquires the synchronous data memorized in the third memory unit, and an update unit that updates the memory content of the second memory unit by reflecting an update content indicated by the synchronous data that is acquired by the synchronous data acquisition unit on the memory content of the second memory unit, and in a case where the acquisition of the synchronous data memorized in the third memory unit fails, the synchronous data acquisition unit requests the synchronous data from the first node, and the synchronous data transmission unit transmits the synchronous data to the second node, in accordance with the request from the synchronous data acquisition unit.

In JP 6555353 B2 described above, even in a case where the second node of the standby system is not constantly in the activation state, a fail-over can be performed to the second node of the standby system from the first node of the active system, and thus, the operational cost can be suppressed.

In addition, in a container-based virtualization environment where a plurality of independent spaces referred to as containers are formed on one host OS, it is necessary for a container management application (CO) to detect failures of various nodes and to suitably perform a fail-over (FO) with respect to the container. In an application where permanent data is required, it is necessary to suitably perform FO with respect to the volume of a storage.

In particular, a node in which a network failure occurs (a FO source node) is isolated from an external device such as a master node or other nodes, and thus, is not capable of receiving communication with the master node or the other nodes through a network. However, the application is continuously operated on the FO source node, and thus, write processing is continuously performed with respect to a block storage device that is connected by a network other than the network to be connected to the master node or the other nodes (a SCSI network such as a SAN). As a result thereof, a write operation occurs with respect to the same volume of the same storage device from both of the FO source node and a FO destination node that is a node taking over the processing of the FO source node, and thus, data stored in the volume is damaged. In JP 6555353 B2 described above, such a problem is not mentioned.

In addition, when connection between the FO source node and the volume of the storage device is released, it is necessary to execute suitable "post-processing" such as the deletion of a device file of the volume associated with connection release with respect to not only a manipulation on the storage device side but also a manipulation on the FO source node side. However, in a state where the network failure occurs, the post-processing is not capable of being prompted to the FO source node from the master node, and thus, the device file of the volume or mount point information remains in the FO source node, and when the FO source node is restored, the volume is not capable of being recognized normally. In JP 6555353 B2 described above, such a problem is not mentioned.

SUMMARY OF THE INVENTION

Therefore, an object of the present invention is to provide a cluster system and a fail-over control method of a cluster system in which a fail-over associated with permanent data can be safely performed in a container-based virtualization environment.

In order to attain the object described above, one aspect of a cluster system of the present invention includes a plurality of nodes to be connected by a first network, in which the plurality of nodes include a master node, a first node performing an IO request with respect to a first volume of a storage device capable of including a plurality of volumes through a second network, and a second node taking over processing of the first node at the time of a failure of the first node. In a case where a failure of the first network occurs in the first node, the master node transmits a connection release instruction for releasing connection between the first node and the first volume to the storage device through the second network, and in a case where the connection release instruction is received, the storage device releases the connection between the first node and the first volume, and updates connection state management information for managing a connection state between the first node and the first volume, and the first node acquires the connection state to be managed by the connection state management information of the storage device through the second network, and executes post-processing relevant to the first volume that is associated with the connection release instruction, on the basis of the acquired connection state.

In addition, one aspect of a fail-over control method of a cluster system of the present invention is a fail-over control method of a cluster system including a plurality of nodes to be connected by a first network, the plurality of nodes including a master node, a connection source node performing an IO request with respect to a first volume of a storage device capable of including a plurality of volumes through a second network, and a connection destination node taking over processing of the connection source node at the time of a failure of the connection source node, in which the master node issues a connection request for requesting connection with respect to the first volume by using a node other than the connection source node in the plurality of nodes as the connection destination node when a failure of the first network of the connection source node is detected. Further, the master node inquires the storage device about a connection state with respect to the first volume to be included in the connection request through the second network. In a case where the first volume is connected to the node other than the connection destination node, the master node issues a connection release instruction for the first volume and a node other than the connection destination node with respect to the storage device through the second network. In a case where the connection release instruction is received through the second network, the storage device sets the connection state of the first volume to a connection release wait state, releases connection between the connection source node and the first volume, and then, sets the connection state of the first volume to an unconnected state. The connection source node inquires the storage device about the connection state of the first volume through the second network, and executes post-processing including deletion of a device file relevant to the first volume in a case where a relationship with respect to the connection source node is in the connection release wait state.

According to the present invention, a fail-over associated with permanent data can be safely performed in a container-based virtualization environment.

BRIEF DESCRIPTION OF THE DRAWINGS

FIG. 5 is a diagram illustrating an example of mount point information according to the embodiment;

FIG. 6 is a diagram illustrating an example of volume connection state management information that is managed by the storage device according to the embodiment;

FIG. 7 is a diagram illustrating an example of node information that is managed by a container management unit according to the embodiment;

FIG. 8 is a diagram illustrating an example of volume information that is managed by the container management unit according to the embodiment;

FIG. 9 is a diagram illustrating an example of a device file according to the embodiment;

FIG. 10 is a diagram illustrating an example of information for SCSI communication according to embodiment;

DETAILED DESCRIPTION OF THE PREFERRED EMBODIMENTS

Figure 1:
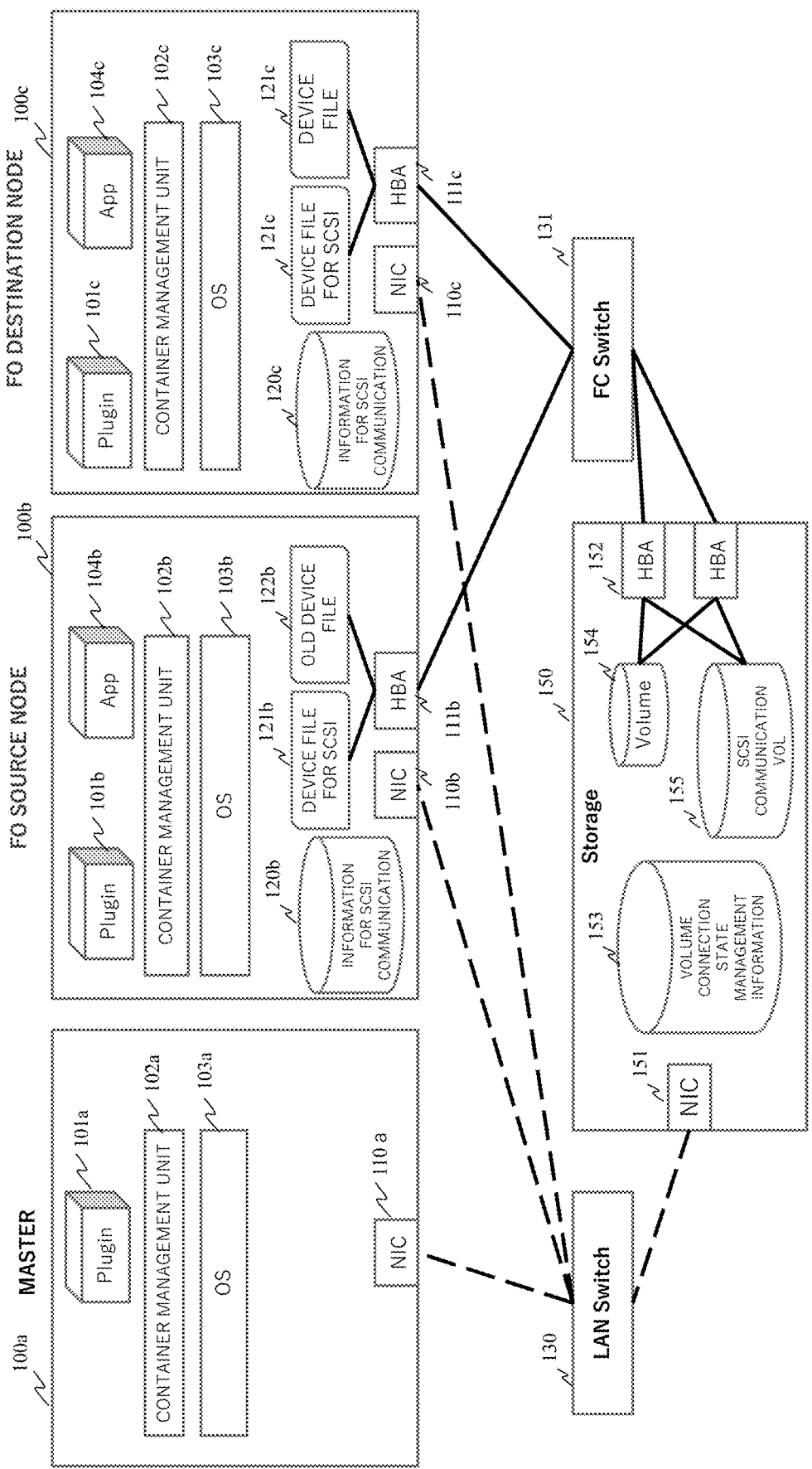
FIG. 1 is a block diagram illustrating an outline of a configuration of a cluster system according to an embodiment.

Hereinafter, an embodiment will be described with reference to the drawings. In addition, in the following description, various information items are described by expression such as a "table", and may be expressed by a data structure other than the table. In addition, the "table" can be referred to as "management information" in order to indicate that the table does not depend on the data structure.

In addition, processing may be described by using a "program" as a subject. Such a program is executed by a processor that is a processing unit, for example, micro processor (MP) or a central processing unit (CPU) to perform set processing. Note that, the processor performs the processing while suitably using a memory resource (for example, a memory) and a communication interface device (for example, a communication port), and thus, the subject of the processing may be the processor or the processing unit. The processor may include dedicated hardware other than the CPU. A computer program may be installed in each computer from a program source. The program source, for example, may be provided by a program distribution server, a memory medium, or the like.

In addition, in the drawings and the description of this example, the same reference numerals will be applied to the same parts, but the present invention is not limited to this example, and all application examples agreeing with the idea of the present invention are included in the technical scope of the present invention. In addition, unless otherwise particularly limited, each constituent may be plural or singular.

Prior to the description of the embodiment, the outline of the embodiment according to the present invention will be described.

EXAMPLE

When connection between a node and a volume of a storage device is released, it is necessary to perform "post-processing" associated with connection release on the node side in addition to processing on the storage device side. In the node, the "post-processing" is processing for performing the deletion of a device file relevant to the volume associated with the connection release and the deletion of mount point information of the volume.

FIG. 1 is a block diagram illustrating the outline of the configuration of a cluster system 10 according to the embodiment. As illustrated in FIG. 1, the cluster system 10 includes a plurality of nodes 100. In the plurality of nodes 100, a node accessing a volume 154 of a storage device 150 will be referred to as a FO source node 100b, and another node taking over processing at the time of a failure of the FO source node 100b will be referred to as a FO destination node 100c.

Here, the "node" corresponds to hardware, a virtual machine, a container, or the like that executes software, and typically, corresponds to an operation unit of an operating system (OS). For example, each of the nodes may be attained in an on-premise environment, or may be attained in a cloud service that is a cloud computing based environment using a virtual machine. Note that, the node may be referred to as an information processing device.

The cluster system provides a predetermined service by the FO source node, performs a fail-over (FO) when abnormity occurs in the FO source node, and provides the predetermined service by the FO destination node instead of the FO source node.

The cluster system 10 includes at least one storage device 150 that is connected to the plurality of nodes 100 through a network.

The plurality of nodes 100 include a master node 100a, the FO source node 100b, and the FO destination node 100c. The network includes a local area network (LAN, an IP network) that connects each of the nodes 100 and the storage device 150 through a LAN switch 130, and a storage area network (SAN, a SCSI network) that connects each of the nodes 100 and the storage device 150 through a FC switch 131.

The master node 100a manages the entire system. The FO source node 100b performs an I/O command with respect to the volume 154 in the storage device 150. The FO destination node 100c takes over the processing at the time of the failure of the FO source node 100b. Herein, the fail-over may be simply referred to as FO, a fail-over source node may be simply referred to as the FO source node, and a fail-over destination node may be simply referred to as FO destination node.

In each of the nodes 100, container management software and plugin software are operated on an operating system 103, and thus, a container management unit 102 and a plugin 101 are configured. In the FO source node 100b, another application 104 for performing a request for reading data stored in the volume 154 and a request for writing data with respect to the volume 154 is also operated. Each of the nodes 100 includes a NIC 110 that is connected to the LAN switch 130 and a HBA 111 that is connected to the FC switch 131.

The storage device 150 includes a NIC 151 that is connected to the LAN switch 130 and a HBA 152 that is connected to the FC switch 131. The storage device 150 is a block storage device that is connected to the node such as the FO source node 100b and the FO destination node 100c by a FC network, receives an I/O request of a SCSI protocol from such nodes, and writes data with respect to the volume 154 or reads data from the volume 154.

In addition, the storage device 150 includes at least one volume 154 that is an I/O request destination from the FO source node 100b, information for specifying the volume 154 and a connection destination node (connection destination node information), volume connection state management information 153 for managing the state, and a volume 155 for SCSI command communication (SCSI communication volume). Note that, the connection destination node information includes information for specifying a node to be connected to the volume 154 and a HBA thereof, and hereinafter, in order to facilitate the description, may be simply described as a node ID.

An OS 103b of the FO source node 100b refers to a device file (device file for SCSI) 122b that temporarily stores a command for performing the I/O command with respect to the volume 154, and a device file 121b that temporarily stores a command with respect to the SCSI communication volume 155. A device file 121 is used in the transmission and reception of a SCSI command according to this example.

In FIG. 1, a case is illustrated in which a failure of a LAN occurs in the FO source node 100b, and a failover is performed to the FO destination node 100c from the FO source node 100b. For this reason, the device file 121c is newly prepared on the FO destination node such that the I/O command with respect to the volume 154 of the storage device 150 is performed, and a device file of the FO source node is described as an old device file 122b.

In this example, the old device file 112b is accurately deleted from the FO source node (the post-processing), in association with the connection release, and thus, a data damage of the volume 154 of the storage device 150 due to the FO source node can be prevented, and in a case where the FO source node is restored from a failure, the volume of the storage device can be correctly recognized.

Figure 2:
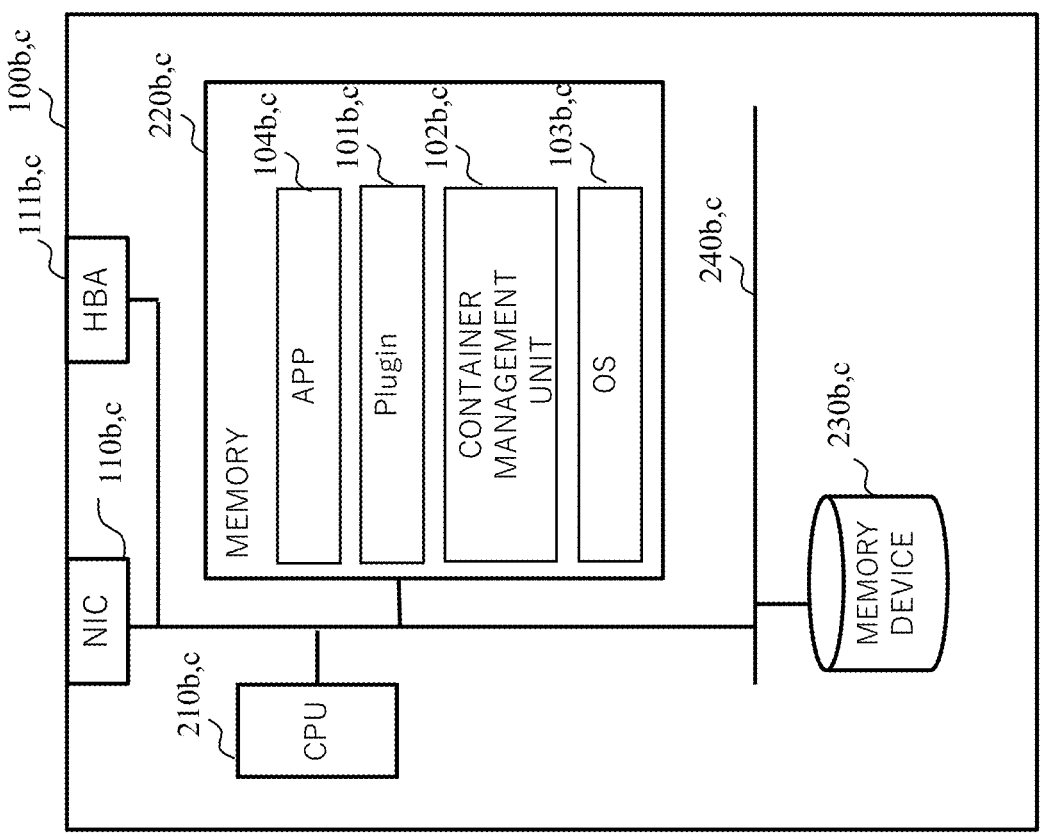
FIG. 2 is a diagram illustrating an example of a hardware block diagram of a node according to the embodiment.

FIG. 2 is a hardware block diagram of the FO source node 100b and the FO destination node 100c, and is a general calculator including a memory device 230 that includes a non-volatile memory element such as a SSD, a memory 220 that includes a volatile memory element such as a RAM, a processing unit 210 such as a CPU that executes a program retained in the memory device 230 by reading the program to the memory 220, performs overall control of the device itself, and performs various determinations, arithmetic operations, and control processings, an input device (not illustrated) that receives key input or voice input from a user, an output device (not illustrated) such as a display that displays processing data, the network interface card (NIC) 110 or the HBA 111 that is a communication device connected to a network to perform communication processing with respect to the other device, and a connection device 240 such as a bus that connects the processing unit 210, the memory 220, the memory device 230, the input device, the output device, the NIC 110, and the like, respectively.

Note that, an application and plugin container management software are operated on the operating software (OS) 103 and are executed by the processing unit 210, and thus, each function of the plugin 101, the container management unit (CO) 102, and the like is attained.

The application 104 performs a request for reading data stored in the volume 154 and for writing data in the volume 154.

The plugin 101 has a function defined as a standard interface with respect to a container-storage virtual device, such as a container storage interface, and manages the connection between the volume of the storage device and the plurality of nodes that are connected through a SAN. For example, Hitachi storage plug-in for containers manufactured by Hitachi, Ltd. can be used.

The container management unit 102 has a function of managing a connection relationship between the node 100 and the storage device 150, and of detecting a failure of the node 100 or the storage device 150. For example, Kubernetes of OSS can be used.

The OS 103 is positioned between the application 104 and the hardware, and performs efficient management with respect to each resource such as the hardware at the same time as providing a standard interface to the user or the application 104. The OS 103 manages the device file in order to transfer the request of the application 104 to the volume 154 of the storage device 150.

Figure 3:
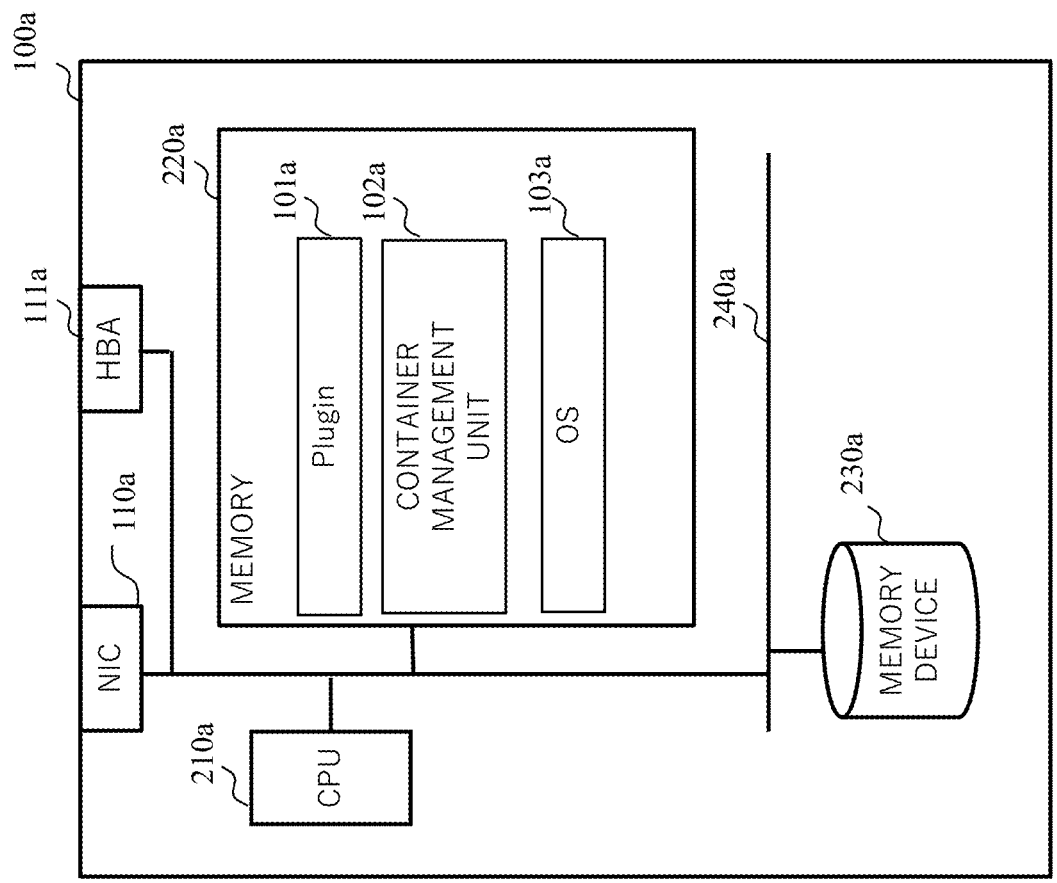
FIG. 3 is a diagram illustrating an example of a hardware block diagram of a master node according to the embodiment.

FIG. 3 is a hardware block diagram of the master node 100a. The master node 100a has the same configuration as that of the FO source node 100b and the FO destination node 100c in FIG. 2, except that there is no application on the memory 220.

Figure 4:
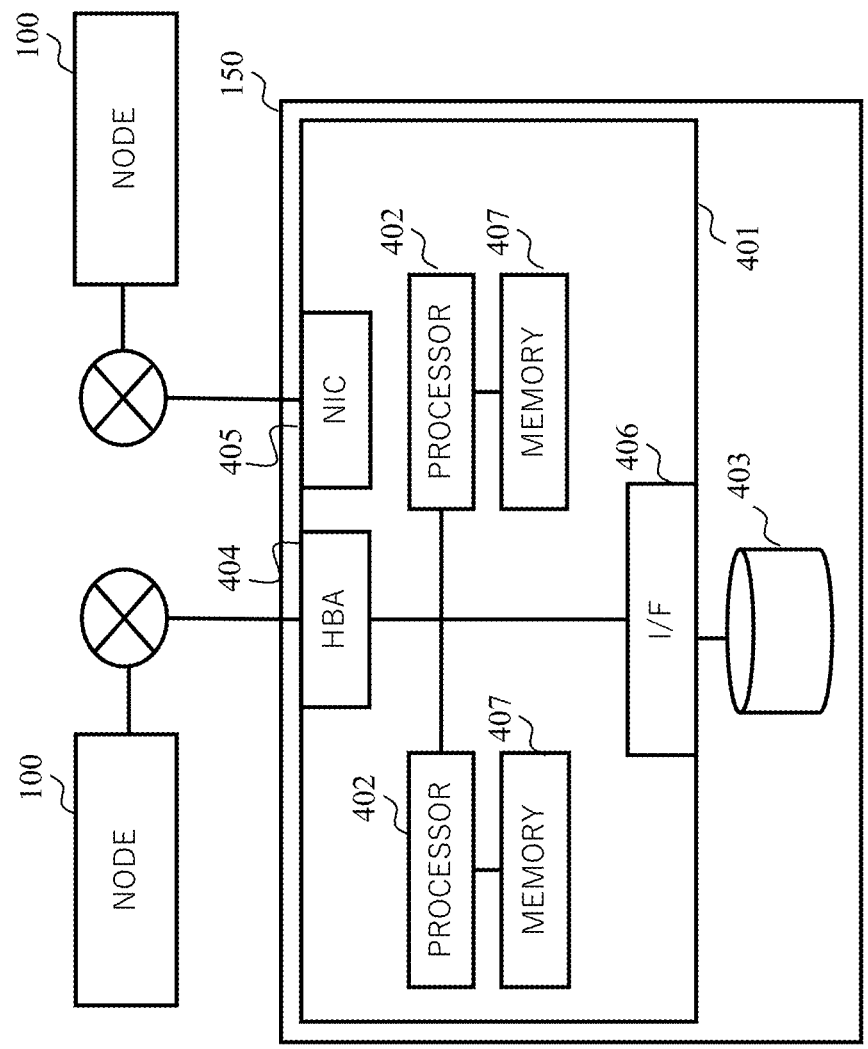
FIG. 4 is a diagram illustrating an example of a hardware block diagram of a storage device according to the embodiment.

FIG. 4, is a hardware block diagram of the storage device.

The storage device 150 is a block storage device that receives the I/O request of the SCSI protocol from the node, and writes data with respect to the volume 154 or reads data from the volume 154, and includes a volume 403 including a plurality of (or one) physical memory devices, and a storage controller 401 connected to the volume 403. The storage controller 401 is an example of a controller including a processor 402.

The storage controller 401 includes a HBA 404 to be connected to a SAN, a NIC 405 to be connected to a LAN, an IF 406, a memory 407, and the processor 402 connected thereto.

The HBA 404 is a communication interface device mediating data exchange between the node 100 and the storage controller 401. The node 100 is connected to the HBA 404 through a SCSI network (including a FC network).

In the nodes 100, the FO source node 100b transmits the I/O request (a write request or a read request) in which an I/O destination (for example, a logic volume number such as a logical unit number (LUN) and a logic address such as a logical block address (LBA)) is designated to the storage controller 401.

The NIC 405 is a communication interface device mediating data exchange between the node 100 and the storage controller 401 through the LAN.

The I/F 406 is a communication interface device mediating data exchange between the plurality of volumes 403 and the storage controller 401. Each of the plurality of volumes 403 corresponds to the volume 154 or the SCSI communication volume 155 in FIG. 1, and corresponds to a volume storing the volume connection state management information 153.

The memory 407 memorizes a program that is executed by the processor 402 and data that is used by the processor 402. The processor 402 executes the program that is stored in the memory 407. For example, a set of the memory 407 and the processor 402 is duplicated.

FIG. 5 is a diagram illustrating mount point information.

Mount point information 500 is managed by the OS 103, and manages a mount source 501 and a mount destination 502 in association with each other.

The mount source 501 manages information of a device file name of a device file for the OS 103 to access the volume 154 of the storage device 150. Each device file manages a device that is mounted on the node for each of the nodes 100. The mount destination 502 indicates a mount point.

FIG. 6 is a diagram illustrating volume connection state management information that is managed by the storage device 150.

Volume connection state management information 600 is managed by the storage controller 401 of the storage device 150, and manages at least a volume ID 601, connection source information 602, connection destination information 603, and a connection state 604 in association with each other.

The volume ID 601 is information for identifying the volume 154 of the storage device 150.

The connection source information (a storage ID) 602 is information for identifying the storage device 150.

The connection destination information (a node ID) 603 is information for identifying a node to which the volume to be specified by the volume ID is connected.

The connection state 604 is information relevant to a connection state between the volume that is specified by the volume ID and the node that is specified by the connection destination information 603. The connection state manages three types of states of a "connected" state in which the node and the volume are connected, an "unconnected" state in which the node and the volume are not connected, a "connection release wait" state before being in the unconnected state while the connection is released by receiving a connection release instruction.

For example, a volume of which the volume ID 601 is "0" exists in the connection source information (the storage ID) 602 of "001", and indicates that the volume and a node that is specified by connection destination information 603 of "1" are in the "connected" state.

Note that, in a case where each of the storage devices 150 includes the volume connection state management information 600, the connection source information (the storage ID) 602 can be uniquely specified, and thus, may be omitted.

FIG. 7 is a diagram illustrating node information that is managed by the container management unit 102.

Node information 700 is managed by the container management unit 102, and manages at least a node name 701 and a node ID 702 in association with each other. The node name 701 is a name applied to a node, and the node ID 702 is information for identifying a node. The node ID 702, for example, is capable of including a node name and a WWN (World Wide Name) of a port to which the storage device 150 is connected.

FIG. 8 is a diagram illustrating volume information that is managed by the container management unit 102.

Volume information 800 is managed by the container management unit 102, and manages at least a volume name 801, a storage ID 802, and a volume ID 803 in association with each other.

The volume name 801 is the name of a volume, and the storage ID 802 is information for identifying a storage device and is information corresponding to the connection source information (the storage ID) 602 of the volume connection state management information 600 in FIG. 6. The volume ID 803 is information for identifying a volume in the storage device 150 and is information corresponding to the volume ID 601 in FIG. 6.

For example, it is indicated that the volume name 801 of "pvcA" corresponds to the volume ID of "1" of the storage ID of "001".

As illustrated in FIG. 7 and FIG. 8, the container management unit 102 of each of the nodes includes the information of the node 100, the storage device 150, and the volume 154 in the storage device 150, and is capable of managing a relationship between each of the nodes and the volume of the storage device to be connected to the node as a node volume correspondence relationship.

FIG. 9 illustrates a device file. A device file 900 is referred to by the OS 103, and manages at least a device file name 901, a storage ID 902, and a volume ID 903 in association with each other.

The device file name 901 is information corresponding to the mount source (the device file name) 501 of the mount point information 500 in FIG. 5. The storage ID 902 is information for identifying a storage device and is information corresponding to the connection source information (the storage ID) 602 of the volume connection state management information 600 in FIG. 6 and the storage ID 802 of the volume information 800 in FIG. 8. The volume ID 903 is information for identifying a volume in the storage device 150 and is information corresponding to the volume ID 601 in FIG. 6 and the volume ID 803 in FIG. 8.

FIG. 10 is a diagram illustrating information 1000 for SCSI communication that is managed by the FO source node 100b and the FO destination node 100c.

The information 1000 for SCSI communication is referred to by the OS 103, and manages at least a storage ID 1001, a volume ID 1002, a device file name 1003, and a SCSI communication information 1004 in association with each other.

The storage ID 1001 is information for identifying a storage device and is information corresponding to the storage ID 602 in FIG. 6 and the storage ID 802 in FIG. 8.

The volume ID 1002 is information for identifying a volume in a storage device.

The device file name 1003 is information corresponding to the mount source (the device file name) 501 of the mount point information 500 in FIG. 5.

The SCSI communication information 1004 is information indicating whether or not SCSI communication can be performed.

Note that, the storage ID 1001, the volume ID 1002, the device file name 1003, and the SCSI communication information 1004 may be provided as NAA.

Figure 11:
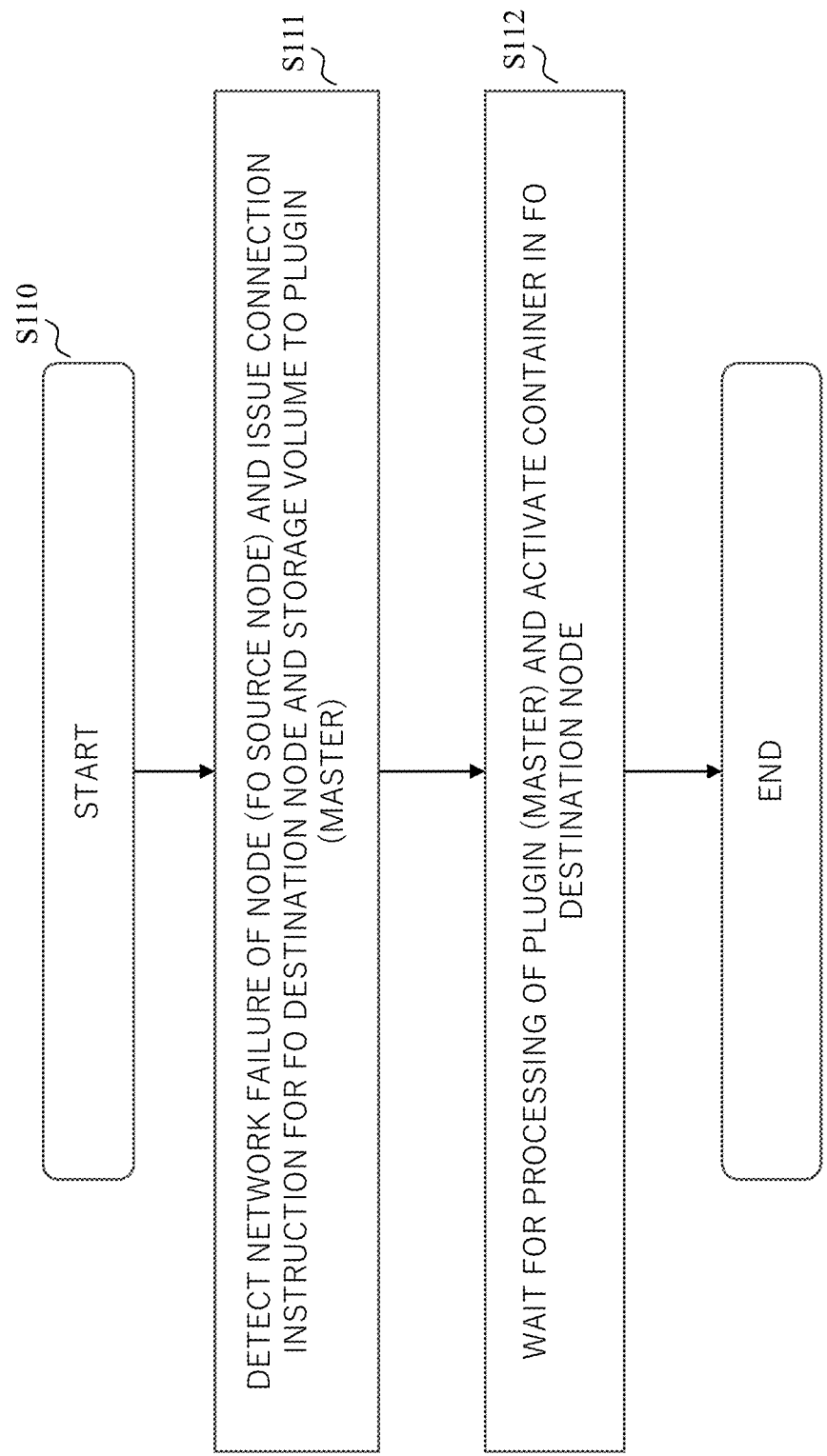
FIG. 11 is a flowchart illustrating processing of the container management unit at the time of a fail-over due to occurrence of a network failure or the like according to the embodiment.

FIG. 11 is a flowchart illustrating processing of a container management unit 102a of the master node 100a at the time of a fail-over due to the occurrence of a network failure. Note that, in the following description, the network failure indicates a failure of a network that is connected by a LAN switch and does not indicate a failure on a SAN side.

The container management unit 102a detects a network failure of a node, and transmits a connection instruction for connecting the connection destination node and the volume to a plugin 101a (S111).

Specifically, in step S111, in a case where a failure is detected, the container management unit 102a specifies the volume that is used by the container management unit 102 of the node in which the failure occurs. The container management unit 102a grasps a correspondence relationship between the node and the volume in the storage device by the node information 700 and the volume information 800. Then, the container management unit 102a specifies the storage ID and the node ID of a node in which a failure does not occur (the connection destination node), corresponding to the volume ID of the specified volume. The connection destination node specifies the node in which the failure does not occur, on the basis of the node information. The connection instruction is transmitted to the plugin 101a by designating the specified storage ID, volume ID, and connection destination node ID.

The container management unit 102a issues the connection instruction to the plugin 101a, and then, waits for the processing of the plugin 101a, and activates the container management unit 102 of the connection destination node (the FO destination node) to be connected by the connection instruction.

Figure 12:
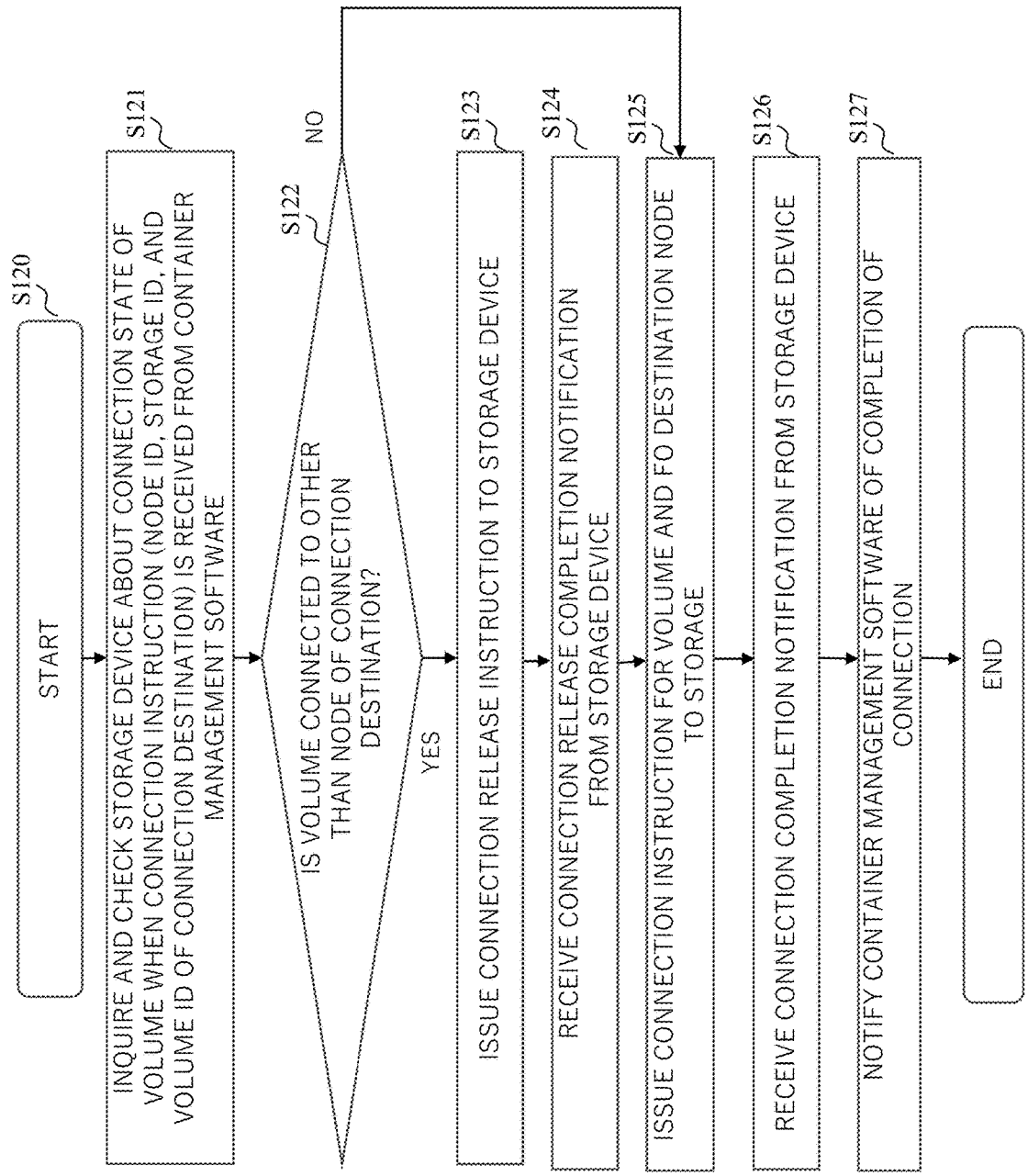
FIG. 12 is a flowchart illustrating processing of a plugin at the time of the fail-over due to the occurrence of the network failure or the like according to the embodiment.

FIG. 12 is a flowchart illustrating the processing of the plugin 101a of the master node 100a at the time of the fail-over due to the occurrence of the network failure.

In a case where the connection instruction is received from the container management unit 102a, the plugin 101a inquires and checks the storage device 150 about a connection state relevant to the volume that is a connection instruction target through a SAN (S121). Note that, in order to specify the node and the volume to be connected, the connection instruction includes the node ID for specifying the connection destination node, the storage ID for specifying the storage device including the volume to be connected, and the volume ID for specifying the volume. Note that, the storage ID and the volume ID are information for specifying the volume that has been used by the FO source node. The plugin 101a transmits a command for inquiring the storage device designated by the connection instruction about the connection state of the volume.

As a result of inquiring the storage device 150, it is determined whether or not the volume in which the connection instruction is received is connected to other than the connection destination node that is connected by the connection instruction (S122). Such determination is performed by comparing the node ID of the connection instruction with the node ID corresponding to the connection state that is transmitted from the storage device 150. The node ID corresponding to the connection state from the storage device 150 is a node ID that is connected to the volume included in the connection instruction and is managed by the volume connection state management information 600.

In step S122, the processing proceeds to step S125 in the case of NO, and the processing proceeds to step S123 in the case of YES.

In step S123, the connection release instruction is transmitted to the storage device 150 through a SCSI network (SAN). That is, in a case where the volume in which the connection instruction is received is already connected to a node other than the node in which the connection instruction is received, the plugin 101a transmits the connection release instruction for releasing the connection of the node that is already connected to the storage device 150 (the volume 155 for SCSI communication) through the SCSI network. The connection release instruction includes the node ID for specifying the node of which the connection is released (the FO source node) and the volume ID for specifying the volume. The storage ID is referred to, in order to specify the storage device that is a transmission destination of the connection release instruction.

In step S124, the plugin 101a receives a connection release completion notification from the storage device 150 through the SCSI network.

In a case where the connection release completion notification is received from the storage device 150, the plugin 101a transmits again the connection instruction including a connection destination node ID that is the FO destination node and the volume ID to the storage device 150 through the SCSI network (S125). At this time, the connection instruction may not include the storage ID. This is because the connection instruction is transmitted by specifying the storage device. Note that, even though it is not illustrated, in step S125, the plugin 101a transmits a connection instruction including the connection destination node ID that is the FO destination node and the volume ID to a plugin 101c of the node 100c that is specified by the connection destination node ID that is the FO destination node. In the connection destination node 100c that is the FO destination node, a device file 122c relevant to a volume that is a connection target and a device file 121c are set, and information 120c for SCSI communication is updated, in accordance with the connection instruction. The processing of the plugin 101c in which the connection instruction is received is identical to the existing processing of the plugin, and thus, the detailed description will be omitted.

In a case where the connection instruction is processed from the storage device 150, and a connection completion notification is received through the SCSI network (S126), the plugin 101a notifies the container management unit 102a of the completion of the connection (S127).

The FO source node in which the network failure of the LAN occurs is isolated from an external device such as the master node or the FO destination node, and thus, the processing for connection or connection release between the FO source node and the volume of the storage device is not capable of being performed, but according to the processing illustrated in FIG. 12, the instruction for connection release between the FO source node and the volume can be performed with respect to the storage device from the master node through the SCSI network.

Figure 13:
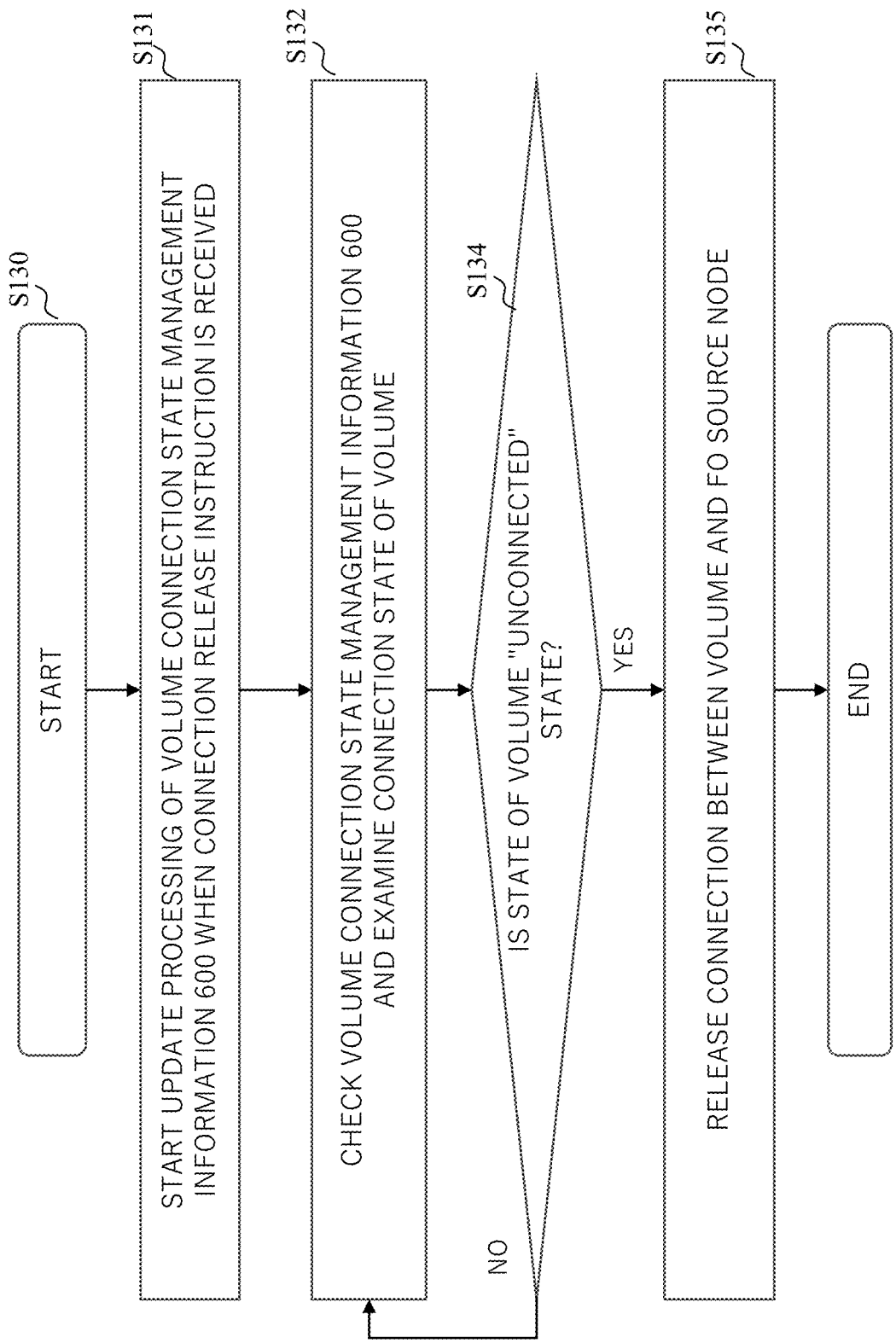
FIG. 13 is a flowchart illustrating processing of the storage device at the time of the fail-over due to the occurrence of the network failure or the like according to the embodiment.

FIG. 13 is a flowchart illustrating the processing of the storage device 150 at the time of the fail-over due to the occurrence of the network failure.

In a case where the connection release instruction is received from the plugin 101a, the storage device 150 starts update processing of the content of the volume connection state management information 600 (S131). Specifically, the storage device 150 receives the connection release instruction including the node ID and the volume ID for specifying the node (the FO source node) and the volume that are connected, respectively, from the plugin 101a. In a case where the connection release instruction is received, the connection state of the volume ID included in the connection release instruction is set to the "connection release wait" state. In a case where the connection state is the "connection release wait" state, the connection release is executed, and in a case where the connection is released, processing of setting the "unconnected" state in the volume connection state management information 600 is executed. Basically, software for performing connection control is different from software for updating the volume connection state management information 600, and thus, software for performing the connection release is processing of checking the state of the volume connection state management information, and then, of executing the connection release. As described above, in the storage device, the connection state between the node and the volume is managed.

In step S132, the volume connection state management information 600 is checked, and the connection state of the volume in which the connection release instruction is received is examined (S132), and it is determined whether or not the connection state of the volume is the "unconnected" state (S134).

In a case where the connection state of the volume is not the unconnected state, the processing returns to step S131, and in a case where the connection state of the volume is the unconnected state, the processing proceeds to S135, and the connection between the volume in which the connection release instruction is received and the node is released (S135).

As described above, in the storage device 150, the connection state between the node and the volume is managed by the volume connection state management information 600, and in a case where the connection release instruction for the node and the volume is received from the plugin 101a, the connection state is updated by the volume connection state management information 600. Accordingly, the connection release instruction of the plugin 101a can be managed by the storage device 150 through the SCSI network, and can be transferred to the node in which the failure occurs (the FO source node).

Various modifications can be considered in the processing illustrated in this drawing, and the processing may be attained in other aspects insofar as the connection state between the volume and the node can be managed by the storage device, and the connection state can be checked, and then, the connection release can be executed.

Figure 14:
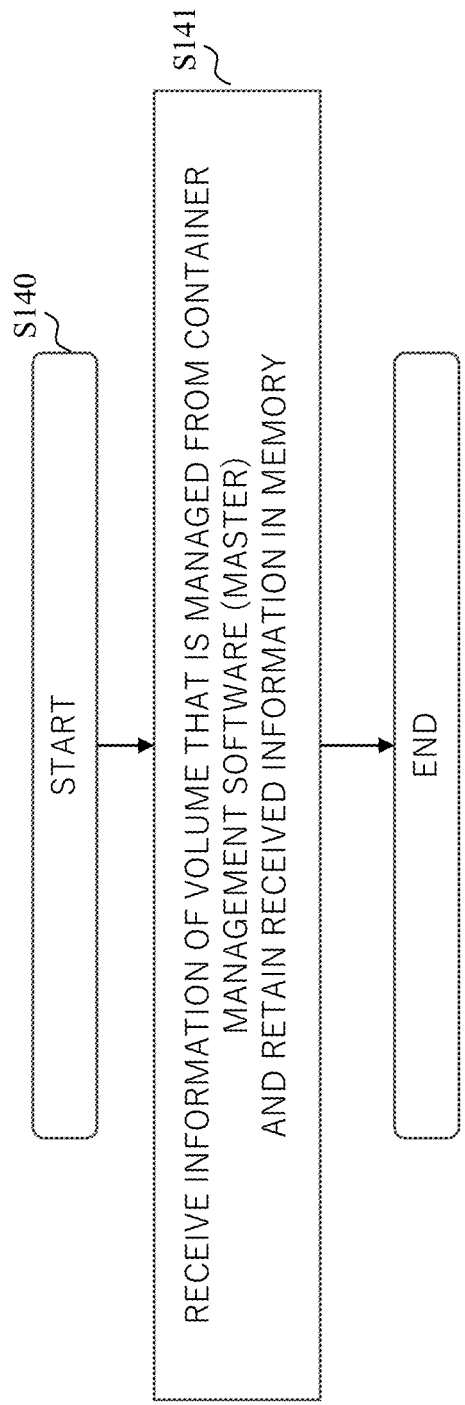
FIG. 14 is a flowchart illustrating processing of a plugin of a node other than the master node according to the embodiment.

FIG. 14 is a flowchart illustrating the processing of the plugin 101 of the node other than the master node, and illustrates normal processing before the network failure occurs.

The plugin 101 of each of the nodes receives the volume information 800 that is managed from the container management unit 102a of the master node 100a, and stores the volume information 800 in the memory 220 of each of the nodes.

The connection destination information (the node ID), the connection source information (the storage ID), and the volume ID are managed by the container management unit 102a of the master node 100a, and the plugin 101 each of the nodes does not includes such information items. For this reason, in preparation for the occurrence of the network failure, it is preferable that the processing in FIG. 14 is periodically executed in order to acquire the information at normal times.

Note that, in FIG. 14, it has been described that the volume information 800 is received in step S141, and the node information 700 or the correspondence relationship between the node (the node ID) and the volume (the storage ID and the volume ID) that are connected may be received and may be stored in the memory.

Figure 15:
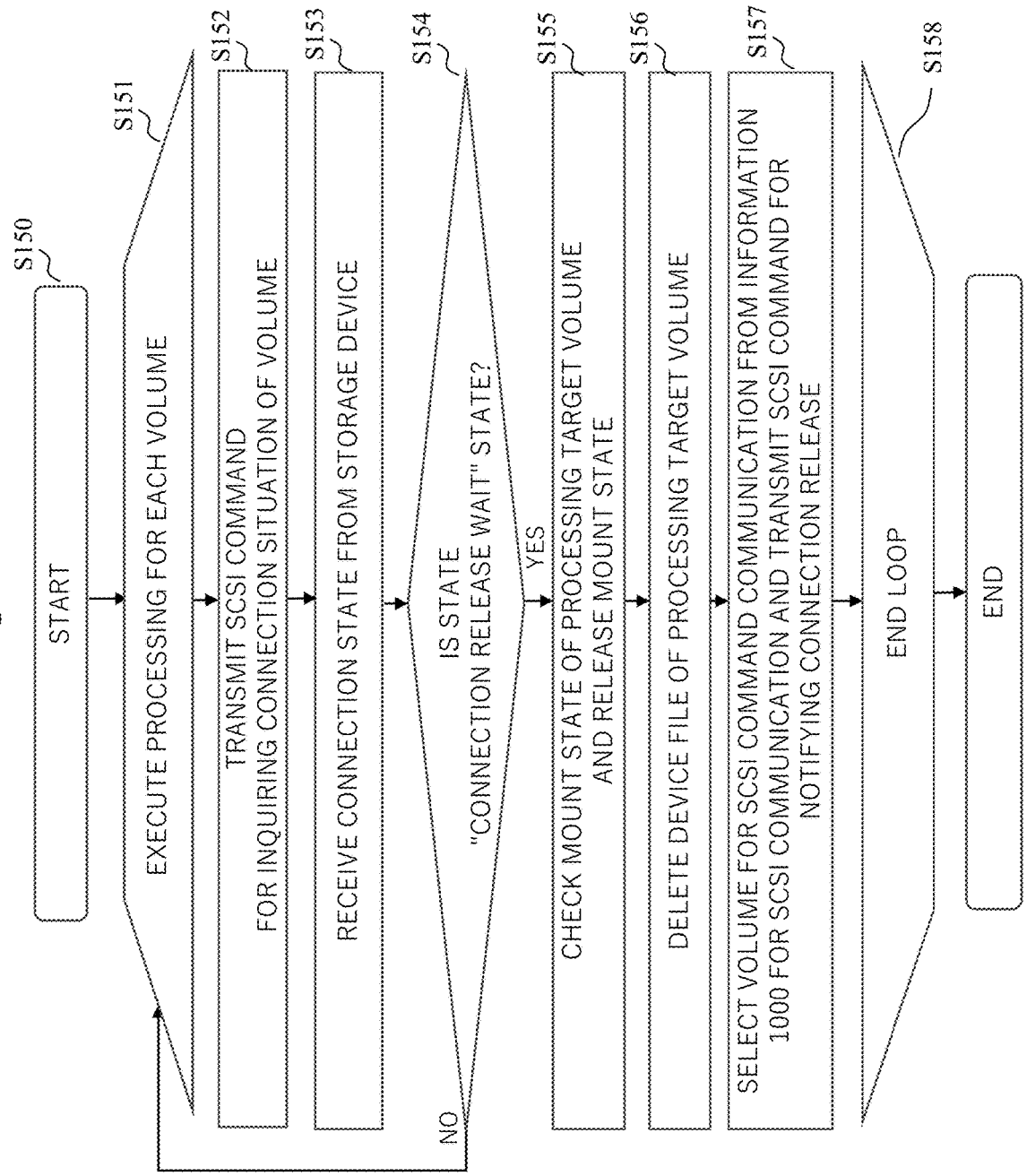
FIG. 15 is a flowchart illustrating processing of a plugin of a node other than the master node in which a failure occurs according to the embodiment.

FIG. 15 is a flowchart illustrating the processing of the plugin 101 of the node in which the failure occurs, and illustrates a processing flow when the network failure occurs and the fail-over is performed.

The plugin 101 periodically executes this processing. The processing of S151 to S158 is executed for each volume by using the volume information acquired in S141 of FIG. 14, and in a case where the processing is executed with respect to all volumes, the processing ends.

In step S152, the plugin 101 issues a SCSI command for inquiring the storage device 150 about the connection situation of the volume through the SCSI network. Specifically, the plugin 101 transmits the SCSI command to the storage device including the volume that is a processing target, on the basis of the storage ID and the volume ID for specifying the storage device and the volume that are a processing target.

In step S153, the plugin 101 receives the connection state of the volume from the storage device 150 through the SCSI network. The storage device 150 feeds back the connection state to the plugin 101, on the basis of the volume ID that is inquired by the SCSI command, with reference to the volume connection state management information 600.

In step S154, the plugin 101 in which the connection state is received from the storage device 150 determines whether or not the state is the "connection release wait" state, and in a case where the state is the connection release wait state, the processing proceeds to step S155, and in a case where the state is not the connection release wait state, the processing returns to step S151, and processing for different volumes is performed.

In step S155, a mount state of the volume that is a processing target is checked, and the mount state associated with the connection release is released. Specifically, the plugin 101 inquires the OS 103 about the corresponding device file name from the volume ID and the storage ID. The OS 103 specifies the device file name corresponding to the volume ID and the storage ID, with reference to the device file 900. At this time, the OS 103 specifies the mount source 501 from the specified device file name, with reference to the mount point information 500, and deletes the relationship with respect to the mount destination (the mount point) 502 (deletes the mount point information).

In step S156, the plugin 101 deletes the device file of the volume that is a processing target in association with the connection release. In step S155, the device file name of the target volume is already specified, and thus, the specified device file is deleted.

In step S157, the plugin 101 selects the SCSI communication volume 155 from the information 1000 for SCSI communication, and transmits the SCSI command for notifying the connection release through the SCSI network. The storage ID 1001, the volume ID 1002, the device file name 1003, and the SCSI communication information 1004 indicating whether or not the volume is for the SCSI communication are managed by being associated with the information 1000 for SCSI communication, and thus, the volume for SCSI communication can be selected.

In step S158, in a case where the unprocessed volume exists, the processing proceeds to step S151, and in a case where the processing is executed with respect to all of the volumes, the processing ends.

According to the processing in FIG. 15, in the node in which the failure occurs (the FO source node), it is found that the connection release is instructed through the SCSI network, and the post-processing of deleting the mount point information and the device file relevant to the volume that is a connection instruction target is executed, and thus, the occurrence of a write operation with respect to the same volume by the FO source node and the FO destination node can be prevented.

Further, when the FO source node is restored, the old device file or the mount point information is already deleted, and thus, the volume is newly recognized and the device file is set at the time of the restoration, and therefore, the volume in the storage device can be correctly recognized.

In general, when the volume is newly connected, the device file is automatically prepared by OSS (for example, Linux (Registered Trademark)), but in a state where the old device file remains, it may not be possible to recognize that the volume is newly connected. For example, new connection is identified on the basis of the HBA, the LUN, or the like of the node, and the value of the LUN may be the same as that of the old connection. More specifically, in a case where the connection is released only on the storage device side without deleting the device file, in a state where the volume of the volume ID of "1" is connected to the node by the LUN of "100", the LUN of "100" is in an empty state on the storage device side, and the device file recognized by the LUN of "100" remains on the node side. At this time, in a case where the volume of the volume ID of "2" is connected to the node by the LUN of "100", the device file is not newly deleted in the node, but the old device file is reused. According to the processing in FIG. 15, the old device file does not remain, and Linux is capable of recognizing the device file normally, and thus, a special manipulation is not required at the time of the restoration.

As described above, according to the processing illustrated in FIG. 15, the post-processing can be accurately performed in the node in which the failure occurs.

Figure 16:
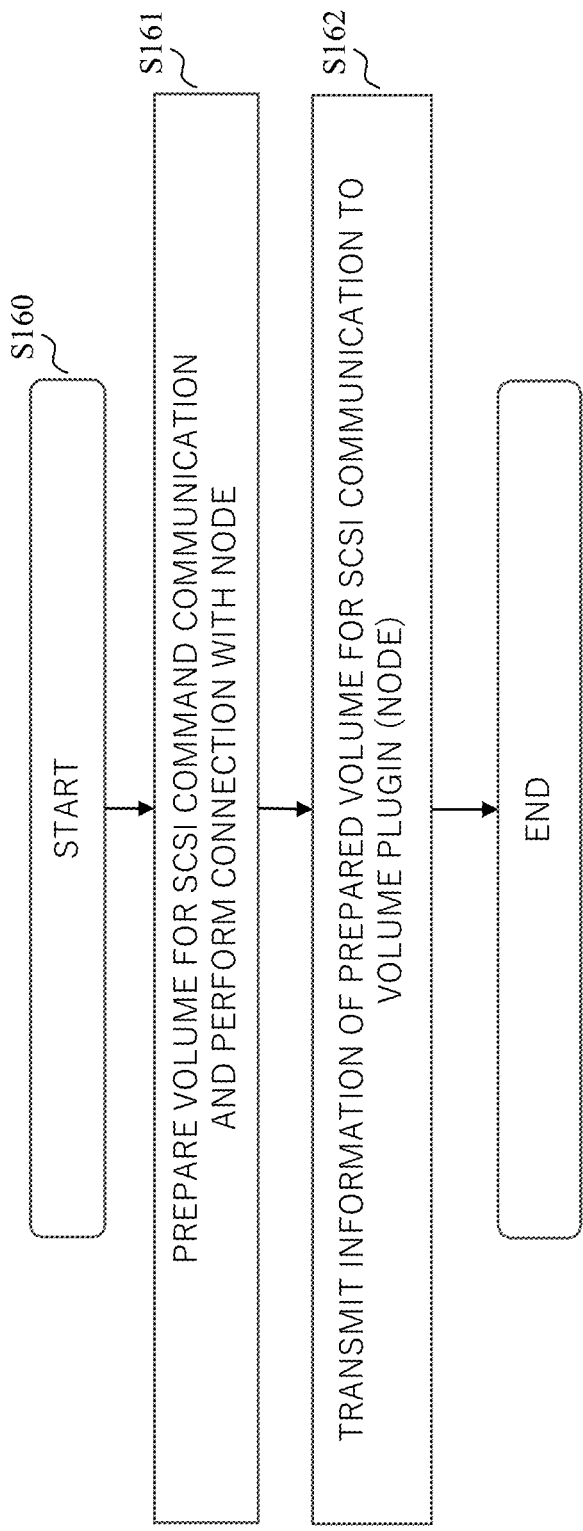
FIG. 16 is a flowchart illustrating the processing of the plugin of the node other than the master node in which the failure occurs according to the embodiment.

FIG. 16 is a flowchart illustrating the processing of the plugin 101a of the master node, and illustrates a processing flow of managing the volume for SCSI communication.

In step S161, the volume 154 of the storage device 150 and the node 100 are initially connected, the plugin 101a prepares the SCSI communication volume 155 for SCSI command communication in the storage device 150, and connects the SCSI communication volume 155, the FO source node 100b, and the FO destination node 100c. The volume for SCSI communication is prepared, and in a case where the volume and the node are connected, such connection is notified to the OS 103a, and is registered in the information 1000 for SCSI communication.

In step S162, the plugin 101a transmits the information of the prepared volume for SCSI communication to a plugin 101b and the plugin 101c of the FO source node 100b and the FO destination node 100c. That is, the information such as the storage ID including the SCSI communication volume 155, the volume ID, and the device file name, which is registered in the information 1000 for SCSI communication, is transmitted. Accordingly, the device files 121b and 121c relevant to the SCSI communication volume 155 can be set.

Figure 17:
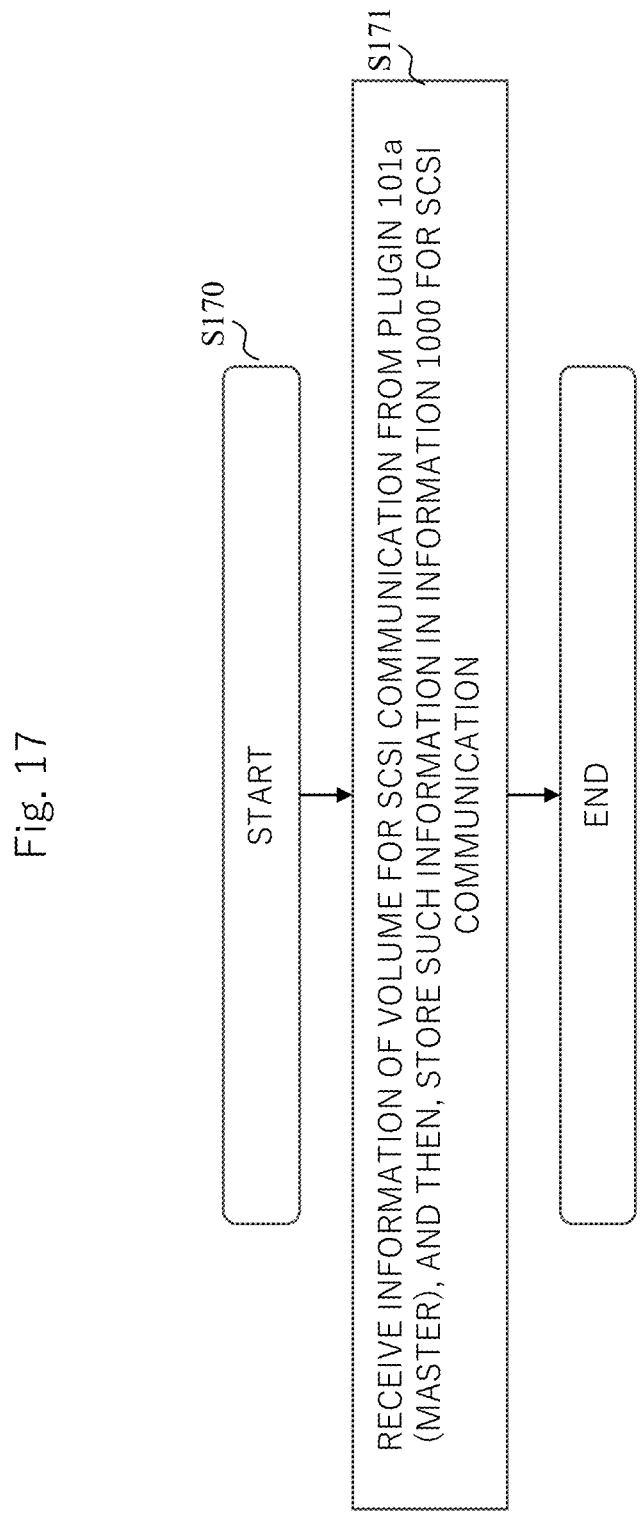
FIG. 17 is a flowchart illustrating the processing of the plugin of the node other than the master node according to the embodiment.

FIG. 17 illustrates processing that is performed by the plugin 101 of the node other than the master node and manages the volume for SCSI communication.

In a case where the information of the SCSI communication volume 155 is received from the plugin 101a of the master node, the plugin 101b of the FO source node 100b or the plugin 101c of the FO destination node 100c stores the information in the information 1000 for SCSI communication of each of the nodes. Accordingly, the device file for SCSI communication relevant to the volume can be set as the FO destination node.

Figure 18:
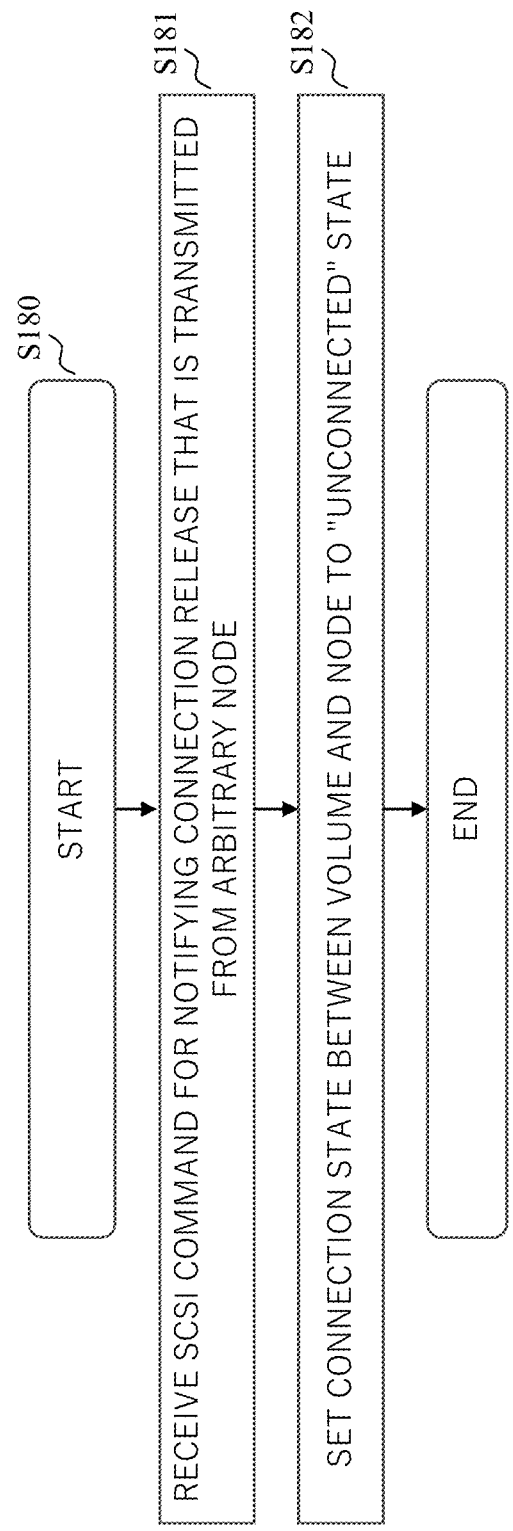
FIG. 18 is a flowchart illustrating a processing flow in a case where the storage device receives connection release from the plugin of the node according to the embodiment.

FIG. 18 is a flowchart illustrating a processing flow in a case where the storage device 150 receives the connection release from the plugin 101 of the node.

In step S181, the storage device 150 receives the connection release instruction command (the SCSI command) for instructing the connection release that is received from the plugin of an arbitrary node.

Note that, such a SCSI command includes the information of the node ID and the volume ID for specifying the node and the volume of which the connection is released, respectively.

In step S182, the storage device 150 sets the connection state between the volume and the node that are a target of the connection release of the volume connection state management information 600 to the unconnected state from the received SCSI command.

As described above, the SCSI command between each of the nodes 100 and the storage device 150 is performed by the SCSI communication volume 155 through the SAN.

Figure 19:
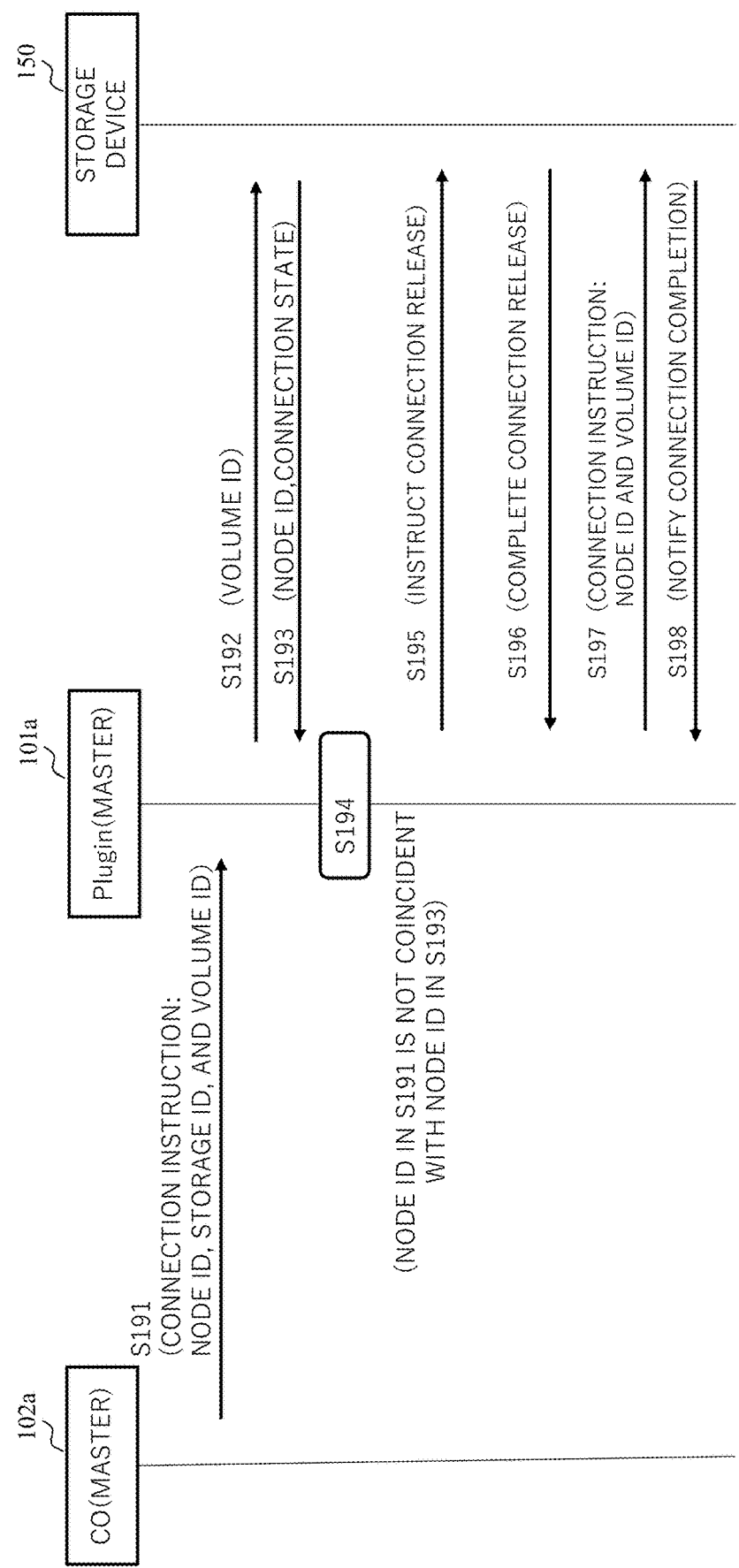
FIG. 19 is a sequence diagram illustrating processing when connection between a node and a volume is performed according to the embodiment.

FIG. 19 is a sequence diagram illustrating processing when the node and the volume 154 of the storage device 150 are connected. Such processing corresponds to the content in FIG. 11 and FIG. 12.

First, the container management unit 102a of the master node 100a designates the connection destination node ID, the storage device ID, and the volume ID, and performs the connection instruction, with respect to the plugin 101a of the master node (S191). As described in step S111 of FIG. 11, the connection instruction specifies the storage ID and the node ID of the node in which the failure does not occur (the connection destination node), corresponding to the volume ID of the volume that is used by the node in which the failure occurs.

The plugin 101a in which the connection instruction is received inquires the storage device 150 that is specified by the storage ID included in the connection instruction about the connection state of the volume that is specified by the volume ID included in the connection instruction (S192).

The storage device 150 transmits the node ID that is connected to the inquired volume and the connection state with respect to the node as the connection destination information to the plugin 101a, with reference to the volume connection state management information 600 (S193).

The plugin 101a compares the node ID of the connection instruction obtained in step S191 with the node ID of the connection destination information obtained in step S193 (S194), and transmits the connection release instruction to the storage device 150 in a case where the node IDs are different from each other (S195). That is, in a case where the volume in which the connection instruction is received is connected to the node other than the node in which the connection instruction is received, the plugin 101a transmits the connection release instruction for releasing the connection of the node that is already connected to the storage device 150.

The storage device 150 changes the connection state between the volume and the node that are already connected to the unconnected state, in accordance with the connection release instruction, and performs the completion notification with respect to the plugin 101a in a case where the connection is released (S196).

In step S197, the plugin 101a transmits the connection instruction including the volume ID and the connection destination node ID for connecting the volume and the node to the storage device 150. At this time, the volume ID and the connection destination node ID correspond to the volume ID and the node ID in which the connection instruction is received in step S191.

The storage device 150 connects the volume ID and the connection destination node ID in which the connection instruction is received in step S197, registers the connection state of the volume connection state management information 600 as the "connected" state, and performs a completion report with respect to the plugin 101a (S198).

Figure 20:
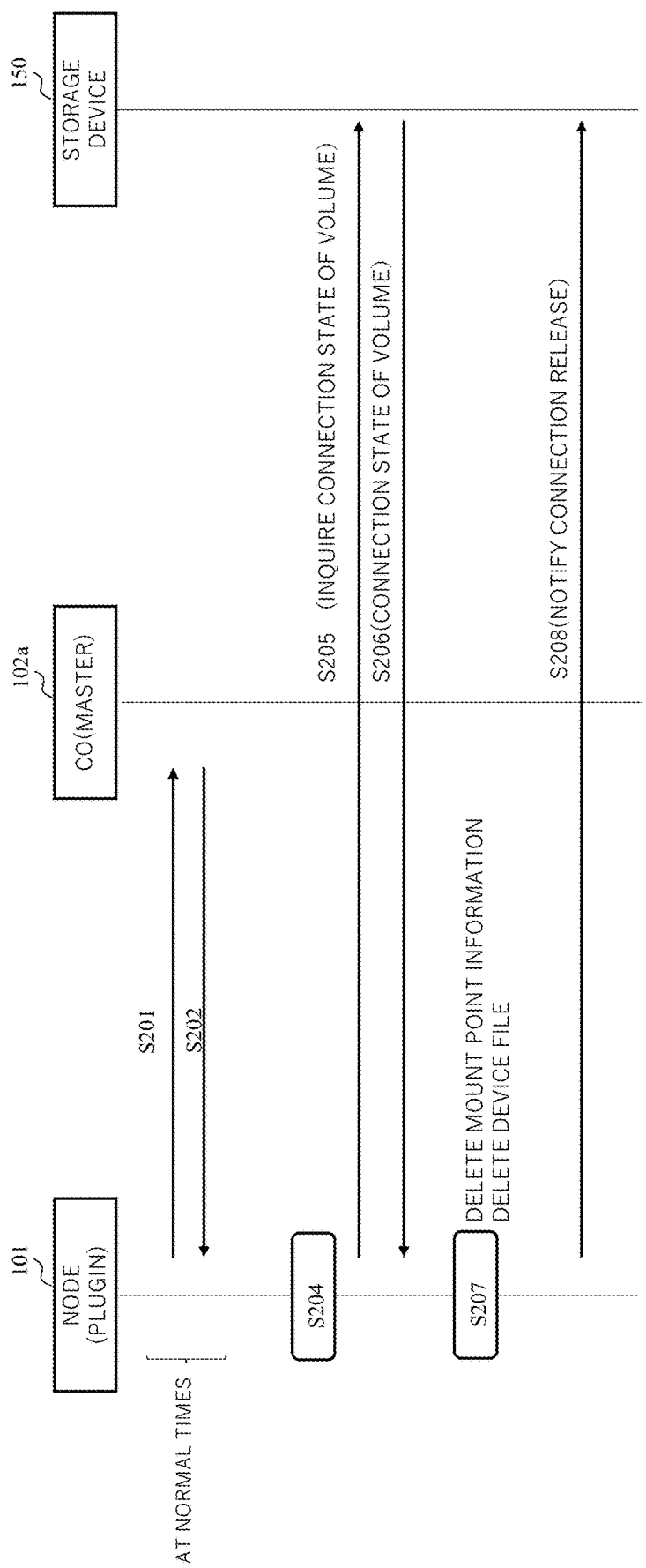
FIG. 20 is a sequence diagram for releasing the connection between the node and the volume when a failure occurs according to the embodiment.

FIG. 20 is a sequence diagram for releasing the when the failure occurs. According to the sequence diagram, in the FO source node, the mount point information and the device file relevant to the volume that is subjected to the connection release are deleted.

In a normal state before the network failure or the like occurs, each of the plugins 101 requests the volume information 800 from the container management unit 102a of the master node 100a (S201), and receives a correspondence relationship between the volume ID and the storage ID, or the like (S202).

Steps S201 and S202 are the processing illustrated in FIG. 14.

The plugin 101 starts the processing, on the basis of the volume information that is received in step S202 (S204). The plugin 101 inquires the storage device 150 about the connection state of the volume (S205).

The storage device 150 feeds back the connection state relevant to the inquired volume to the plugin 101 (S206).

In the plugin 101, it is determined whether or not the connection state from the storage device 150 is the "connection release wait" state, and in a case where the connection state is the connection release wait state, the mount point information and the device file information relevant to the volume are deleted (S207).

The plugin 101 transmits the connection release completion notification in which the volume ID for specifying the volume and the node ID of the node that is connected are designated to the storage device 150 through the volume for SCSI communication (S208). Steps S205 to S208 correspond to the processing described in FIG. 15.

According to this example, in a container-based virtualization environment where a plurality of independent spaces referred to as containers are formed on one host OS, the volume of the storage can also be suitably subjected to FO.

In addition, according to this example, the FO source node in which the network failure occurs is isolated from the external device such as the master node or the FO source node, and thus, is not capable of receiving the communication with the master node, the FO destination node, or the like through the network, but connection release for the FO source node and the volume can be instructed to the storage device from the master node through the SCSI network, and in the FO source node, the connection release instruction can be received from the storage device through the SCSI network.

In addition, according to this example, in the node in which the failure occurs (the FO source node), in a case where the connection release instruction is received through the SCSI network, the mount point information and the device file relevant to the volume that is a connection instruction target are deleted, and thus, the occurrence of the write operation with respect to the same volume by the FO source node and the FO destination node can be prevented.

Further, according to this example, when the FO source node is restored, the old device file or the mount point information is already deleted, and thus, the volume in the storage device can be correctly recognized.

As described above, according to this example, the failover associated with the permanent data can be safely performed in the container-based virtualization environment.

The example described above has been described in detail in order to describe the present invention in a comprehensible manner, but is not necessarily limited to including all of the configurations described above. In addition, a part of the configuration of one example can be replaced with the configuration of the other example, and the configuration of the other example can also be added to the configuration of one example. In addition, the addition, the deletion, and the substitution of the other configuration can be performed with respect to a part of the configuration of each of the examples.

Each of the configurations, the functions, the processing units, and the like described above may be attained by hardware, for example, by designing a part or all thereof as an integrated circuit. In addition, each of the configurations, the functions, and the like described above may be attained by using software by interpreting and executing a program for a processor to attain each of the functions.

Information such as a program, a table, and a file for attaining each of the functions can be stored in a recording device such as a memory, a hard disk, or a solid state drive (SSD), or a recording medium such as an IC card or a SD card.

What is claimed is:

1. A cluster system, comprising:
   a plurality of nodes to be connected by a first network, each of the plurality of nodes including a processor and a memory; and
   a storage device including a processor and a memory,
   wherein the plurality of nodes include a master node, a first node performing an I/O request with respect to a first volume of the storage device capable of including a plurality of volumes through a second network, and a second node taking over processing of the first node at a time of failure of the first node,
   when a failure of the first network occurs in the first node, the master node transmits a connection release instruction for releasing connection between the first node and the first volume to the storage device through the second network,
   when the connection release instruction is received, the storage device releases the connection between the first node and the first volume, and updates connection state management information for managing a connection state between the first node and the first volume, and
   the first node acquires the connection state to be managed by the connection state management information of the storage device through the second network, and executes post-processing relevant to the first volume that is associated with the connection release instruction, on a basis of the acquired connection state.

2. The cluster system according to claim 1,
   wherein the second network is a network of a SCSI protocol, and
   the post-processing to be executed by the first node includes deletion of a device file relevant to the first volume.

3. The cluster system according to claim 2,
   wherein the post-processing to be executed by the first node further includes deletion of mount point information relevant to the first volume.

4. The cluster system according to claim 3,
   wherein the first node executes the post-processing when the connection state between the first node and the first volume that is managed by the storage device is a connection release wait state.

5. The cluster system according to claim 4,
   wherein the first node includes a device file for SCSI communication in which the connection release instruction to be transmitted to the storage device is stored.

6. The cluster system according to claim 4,
   wherein each of the plurality of nodes includes a container management unit managing a connection relationship between the plurality of nodes and the storage device to detect the failure of the first network of the plurality of nodes.

7. The cluster system according to claim 4,
   wherein the plurality of nodes are a virtual machine or a container.

8. A fail-over control method of a cluster system including a plurality of nodes to be connected by a first network, the plurality of nodes including a master node, a connection source node performing an I/O request with respect to a first volume of a storage device capable of including a plurality of volumes through a second network, and a connection destination node taking over processing of the connection source node at a time of a failure of the connection source node,
   wherein the master node
   issues a connection request for requesting connection with respect to the first volume by using a node other than the connection source node in the plurality of nodes as the connection destination node when a failure of the first network of the connection source node is detected,
   inquires the storage device about a connection state with respect to the first volume to be included in the connection request through the second network, and
   issues a connection release instruction for the first volume and a node other than the connection destination node with respect to the storage device through the second network when the first volume is connected to the node other than the connection destination node,
   when the connection release instruction is received through the second network, the storage device sets the connection state of the first volume to a connection release wait state, releases connection between the connection source node and the first volume, and then, sets the connection state of the first volume to an unconnected state, and
   the connection source node inquires the storage device about the connection state of the first volume through the second network, and executes post-processing including deletion of a device file relevant to the first volume when a relationship with respect to the connection source node is in the connection release wait state.

9. The fail-over control method of a cluster system according to claim 8,
   wherein the second network is a SCSI network, and
   the first network is an IP network to be connected by a LAN switch.

10. The fail-over control method of a cluster system according to claim 9,
    wherein the plurality of nodes excluding the master node receive information relevant to a connection relationship between the plurality of volumes of the storage device and the plurality of nodes from the master node.

* * * * *